(12) United States Patent
Holcman et al.

(10) Patent No.: US 8,463,279 B2
(45) Date of Patent: *Jun. 11, 2013

(54) METHODS AND APPARATUS FOR APPLICATION NETWORK-SERVER DETERMINATION FOR REMOVABLE MODULE-BASED WIRELESS DEVICES

(75) Inventors: Alejandro R. Holcman, San Diego, CA (US); Nakul Duggal, San Diego, CA (US); Bryan Gurganus, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 746 days.

This patent is subject to a terminal disclaimer.

(21) Appl. No.: 12/185,344

(22) Filed: Aug. 4, 2008

(65) Prior Publication Data

US 2009/0082029 A1 Mar. 26, 2009

Related U.S. Application Data

(60) Provisional application No. 60/975,405, filed on Sep. 26, 2007.

(51) Int. Cl.
*H04W 72/00* (2009.01)
*H04M 3/00* (2006.01)

(52) U.S. Cl.
USPC .................. 455/452.1; 455/418; 455/419

(58) Field of Classification Search
USPC .......... 455/458, 452.1, 414.1, 425, 418–420, 455/550.1, 552.1
See application file for complete search history.

(56) References Cited

U.S. PATENT DOCUMENTS

| | | | |
|---|---|---|---|
| 5,675,628 A | 10/1997 | Hokkanen | |
| 6,557,753 B1 | 5/2003 | Beaujard et al. | |
| 6,584,326 B1 | 6/2003 | Boydston et al. | |
| 6,725,056 B1 * | 4/2004 | Moles et al. | 455/524 |
| 6,801,528 B2 | 10/2004 | Nassar | |
| 6,829,593 B1 | 12/2004 | Ritter et al. | |
| 6,845,153 B2 | 1/2005 | Tiburtius et al. | |
| 6,916,546 B2 | 7/2005 | Schoennenbeck et al. | |

(Continued)

FOREIGN PATENT DOCUMENTS

| | | |
|---|---|---|
| CN | 1864429 A | 11/2006 |
| CN | 1969527 A | 5/2007 |

(Continued)

*Primary Examiner* — Brandon Miller
(74) *Attorney, Agent, or Firm* — Abdollah Katbab

(57) ABSTRACT

Methods, apparatus and systems are presented that enable a network operator to control the source for network services in open market devices by provisioning the network operator-issued removable modules with network service provisioning information associated with the operator and configuring the open market wireless devices such that the device looks to the removable module first for the network service provisioning information before looking to device storage for any other provisioning information related to the network service. In this regard, the user of the open market wireless device is still provided access to the network service even if the network operator does not provide the service or provide access to the service. Additionally, the described aspects methods, systems and apparatus provide the network operator with an additional level of dynamic control over the source for network services by providing for a network-side proxying feature that allows the network operator to proxy network service requests sent from the open market wireless devices to a designated third party network service provider based on criteria defined by the network operator.

38 Claims, 9 Drawing Sheets

U.S. PATENT DOCUMENTS

| | | |
|---|---|---|
| 6,944,150 B1 | 9/2005 | McConnell et al. |
| 7,149,293 B1 | 12/2006 | Coppage et al. |
| 7,149,545 B2 | 12/2006 | Hurst et al. |
| 7,292,855 B2 | 11/2007 | Kumar et al. |
| 7,353,017 B2 * | 4/2008 | Chen et al. ............... 455/414.2 |
| 7,366,780 B2 | 4/2008 | Keller et al. |
| 7,389,119 B2 | 6/2008 | Weigele |
| 7,613,479 B2 | 11/2009 | Twigg et al. |
| 7,792,759 B2 | 9/2010 | Sahota et al. |
| 7,826,842 B2 * | 11/2010 | Buckley et al. ............ 455/435.2 |
| 2002/0188736 A1 | 12/2002 | Jarvensivu |
| 2003/0125023 A1 | 7/2003 | Fishler |
| 2003/0186722 A1 | 10/2003 | Weiner |
| 2003/0211840 A1 | 11/2003 | Castrogiovanni et al. |
| 2003/0211861 A1 | 11/2003 | Castrogiovanni et al. |
| 2003/0220101 A1 | 11/2003 | Castrogiovanni et al. |
| 2004/0043788 A1 | 3/2004 | Mittal |
| 2004/0075675 A1 | 4/2004 | Raivisto et al. |
| 2004/0192306 A1 | 9/2004 | Elkarat et al. |
| 2004/0192386 A1 | 9/2004 | Aerrabotu et al. |
| 2004/0203737 A1 | 10/2004 | Myhre et al. |
| 2004/0204051 A1 | 10/2004 | Scott et al. |
| 2004/0204087 A1 | 10/2004 | Carlsson |
| 2004/0204089 A1 | 10/2004 | Castrogiovanni et al. |
| 2004/0228356 A1 | 11/2004 | Adamczyk et al. |
| 2004/0230677 A1 | 11/2004 | Ohara |
| 2005/0020308 A1 | 1/2005 | Lai |
| 2005/0064862 A1 | 3/2005 | Castrogiovanni et al. |
| 2005/0071423 A1 | 3/2005 | Rajaniemi |
| 2005/0071459 A1 | 3/2005 | Costa-Requena et al. |
| 2005/0085244 A1 | 4/2005 | Choi et al. |
| 2005/0147127 A1 | 7/2005 | Putcha et al. |
| 2005/0153741 A1 | 7/2005 | Chen et al. |
| 2005/0174937 A1 | 8/2005 | Scoggins et al. |
| 2005/0184163 A1 | 8/2005 | De Jong |
| 2005/0184164 A1 | 8/2005 | De Jong |
| 2005/0184165 A1 | 8/2005 | De Jong |
| 2005/0188360 A1 | 8/2005 | De Jong |
| 2005/0239504 A1 | 10/2005 | Ishii et al. |
| 2006/0059125 A1 | 3/2006 | Yan |
| 2006/0099600 A1 | 5/2006 | McIntire |
| 2006/0126590 A1 | 6/2006 | Putcha et al. |
| 2006/0141987 A1 | 6/2006 | De Groot |
| 2006/0143098 A1 | 6/2006 | Lazaridis |
| 2006/0172734 A1 | 8/2006 | Tak |
| 2006/0195593 A1 | 8/2006 | Shiraki et al. |
| 2006/0217113 A1 | 9/2006 | Rao et al. |
| 2006/0234760 A1 | 10/2006 | Cheng |
| 2006/0258341 A1 | 11/2006 | Miller et al. |
| 2006/0262736 A1 | 11/2006 | Dong et al. |
| 2006/0270453 A1 | 11/2006 | Di Giorgio et al. |
| 2007/0115950 A1 | 5/2007 | Karaoguz et al. |
| 2007/0177562 A1 | 8/2007 | Castrogiovanni et al. |
| 2007/0186107 A1 | 8/2007 | Sonetaka |
| 2007/0202749 A1 | 8/2007 | Bhat et al. |
| 2007/0218871 A1 | 9/2007 | Bonner |
| 2007/0224969 A1 | 9/2007 | Rao |
| 2007/0232354 A1 | 10/2007 | Moscovitz et al. |
| 2007/0245008 A1 | 10/2007 | Matsui et al. |
| 2007/0293192 A9 | 12/2007 | De Groot |
| 2008/0014956 A1 | 1/2008 | Balasubramanian |
| 2008/0014984 A1 * | 1/2008 | Brown et al. ............... 455/552.1 |
| 2008/0034425 A1 | 2/2008 | Overcash et al. |
| 2008/0049662 A1 | 2/2008 | Islam et al. |
| 2008/0057957 A1 * | 3/2008 | Altbaum et al. ........... 455/435.1 |
| 2008/0108333 A1 | 5/2008 | Jemison et al. |
| 2008/0146280 A1 | 6/2008 | Sasse et al. |
| 2008/0161050 A1 | 7/2008 | Shudark et al. |
| 2009/0061833 A1 | 3/2009 | Ho et al. |
| 2009/0081996 A1 | 3/2009 | Duggal et al. |
| 2009/0082004 A1 | 3/2009 | Duggal et al. |
| 2010/0035595 A1 | 2/2010 | Duggal et al. |

FOREIGN PATENT DOCUMENTS

| | | |
|---|---|---|
| EP | 1265397 A2 | 12/2002 |
| EP | 1411712 | 4/2004 |
| EP | 1519600 A2 | 3/2005 |
| EP | 1050175 B1 | 4/2005 |
| EP | 1564960 A1 | 8/2005 |
| JP | 3056082 B2 | 6/2000 |
| JP | 2001134688 A | 5/2001 |
| JP | 2001224062 A | 8/2001 |
| JP | 2004153461 A | 5/2004 |
| JP | 2005537715 A | 12/2005 |
| JP | 2006174158 A | 6/2006 |
| JP | 2007506370 A | 3/2007 |
| RU | 2169437 | 6/2001 |
| RU | 2000115584 A | 6/2002 |
| RU | 2196393 C2 | 1/2003 |
| RU | 2005115091 A | 11/2005 |
| WO | WO2004021590 | 3/2004 |
| WO | WO2004036941 | 4/2004 |
| WO | WO2005029748 A2 | 3/2005 |
| WO | WO2005036916 A1 | 4/2005 |
| WO | WO2005053348 | 6/2005 |
| WO | WO2005103919 A1 | 11/2005 |
| WO | WO2006109155 A2 | 10/2006 |
| WO | WO2007081727 | 7/2007 |

* cited by examiner

METHODS AND APPARATUS FOR APPLICATION NETWORK-SERVER DETERMINATION FOR REMOVABLE MODULE-BASED WIRELESS DEVICES

CLAIM OF PRIORITY UNDER 35 U.S.C. §119

The present Application for Patent claims priority to Provisional Application No. 60/975,405, entitled, "Apparatus and Methods Associated with Open Market Handsets," filed on 26 Sep. 2007 and assigned to the assignee hereof and hereby expressly incorporated by reference herein.

CROSS-REFERENCE TO RELATED APPLICATIONS

The present application is related to U.S. patent application Ser. No. 12/185,321, entitled "Apparatus and Methods for Network Identification of Open Market Wireless Devices,"; U.S. patent application Ser. No. 12/185,298, entitled "Methods and Apparatus for Dynamic Source Determination of Provisioning Information on a Per-item Basis for Open Market Wireless Devices,"; U.S. patent application Ser. No. 12/185,283, entitled "Systems and Methods for Provisioning Wireless Devices Based on Multiple Network-Service Application Profiles and Data Session Conflict Resolution". These applications have been filed concurrently herewith the present application and are assigned to the same assignee as the present invention. These applications are hereby incorporated by reference as if set forth fully herein.

BACKGROUND

1. Field

The present aspects relate to wireless communication devices, and more particularly, to apparatus and methods associated with determination of application service network-server for removable module-based wireless devices.

2. Background

A wireless communication device, otherwise referred to as a handset, is utilized to communicate with another handset or a landline phone via a wireless communication network. In order to establish a connection with the wireless communication network, the handset must have a relationship with an operator or service provider to allow access to the wireless communication network and to manage billing the user of the handset for the use of the wireless communication network. In a closed market system, the operator maintains a degree of control over the distribution and sale of handsets operable on the wireless communication network of the operator. For example, the operator may distribute and sell the handsets itself, or authorize a third party to perform this task, where the respective closed market handsets are authorized and provisioned by the operator to work on the wireless communication network of the operator. Thus, a closed market handset is limited for use in a specific wireless communication network corresponding to the respective operator.

In contrast to the closed market system, an open market system allows a handset to be distributed and sold for use on any of a plurality of wireless communication networks each corresponding to a respective one of a plurality of different operators. In the closed market system, a user must obtain a user identity module, such as a smart card, from one of the plurality of different operators, where the user identity module includes a key or other authorization mechanism allowing operation on one of the plurality of wireless communication networks. The user may then insert a removable module that includes user identity information into the open market handset, thereby enabling the open market handset to communicate with the respective wireless communication network associated with the operator that authorized the removable module. For example, a removable module may be referred to as a Removable User Identity Module (RUIM) for a Code Division Multiple Access (CDMA) system, a CDMA Subscriber Identity Module (CSIM) based on a Universal Integrated Circuit Card (UICC) for a CDMA system, Universal Subscriber Identity Module (USIM) based on a UICC for Universal Mobile Telecommunications System (UMTS), or a Subscriber Identity Module (SIM) in a Global System for Mobile communications (GSM) system. For the sake of brevity the term removable module is used herein throughout to refer to any module that may be inserted or otherwise is communication with a wireless device that provides for storage of data, such as user identity information.

In a closed market system, handsets are purchased or otherwise procured by users from network operators. In turn, the network operators acquire the handsets from the Original Equipment Manufacturers (OEMs) and, as such, the network operators have control over the OEM software that resides on the handset. In this regard, the network operator will provide provisioning information for network services on the handset, either included in the non-volatile memory of the handset or the permanent user identity module in the handset. Thus, if the network operator provides a specific network service, for example a download service, the network operator will configure the handset with provisioning information that requires the handset to receive the network service from the network operator. In other words, the provisioning information on the device is defined such that an input to launch a network service will result in the handset accessing the network service server that is controlled by the network operator to receive the service.

However, in the open market environment, in which the handsets are no longer distributed, controlled and/or provisioned by the network operator, the ability to receive network services becomes more problematic. For example, a specified network service may be provided by multiple sources, such as the network operator associated with the user's current removable module, an OEM or any other network third party capable of delivering the service. In the instance in which the network service is provided by multiple sources, the network operator desires the ability to insure that the handset receives the services from the network operator or from a source designated by the network operator. As such, if the network operator has control over the handsets source for a network service, the network operator can enter into business arrangements with third party service providers to provide handsets with the service in predetermined situations. In certain instances a network service may not be available or otherwise provided for by the network operator associated with the user's current removable module, however the user may still desire to receive the service from the OEM and/or some other third party offering the desired network service.

Therefore, a need exists to develop methods, systems and apparatus to allow a network operator to control the source for network services in open market devices. Specifically, the network operator should be able to control whether the handset is provided a network service from the network operator or from a third party, such as an OEM or the like. The desired level of control should be dynamic, such that the network operator can change control of the network source from the network operator to a third party or vice versa on-the-fly as dictated by business arrangements, circumstances or the like. In addition, a need exists for methods, systems and apparatus that provide the user of the handset access to network services even if the network operator does not provide the service or otherwise make the service available.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Present aspects define systems, apparatus and methods that allow network operators to control the source of network services for open market wireless devices, such as network download services and the like. To accomplish this aspect, the wireless device is configured with source determination logic which looks first to the associated removable module for network service provisioning information and, if the network service provisioning information is not found on the removable module, then looks to the non-volatile memory of the wireless device for the network service provisioning information. In this regard, since in the open market environment the removable module is controlled by the network operator, the network operator can provide provisioning information on the removable module that insures that the source of the network service is the network operator or some other third party designated by the network operator. Since the open market wireless device is not controlled by the network operator, the network service provisioning information stored on the device is typically third party provisioning information, such as Original Equipment Manufacturer (OEM) provisioning information or the like. By implementing source determination logic that looks to the removable module first for the network service provisioning information, the network operator insures that they are the source for the network service, if they provide the service and have provisioned the removable module accordingly.

Additionally, present aspects define systems, apparatus and methods that provide for the network operator to dynamically control the source of network services for open market wireless devices. To accomplish this aspect, servers at the network operator end are configured with proxying logic, which allows the network operator to proxy network service launch requests to third party network service providers, if the network operator deems proxying necessary. Proxying by the network operator may be necessary if the network operator has entered into a predetermined business arrangement with a third party network service provider, such as a revenue sharing arrangement or the like. In some aspects, a proxying routine may be implemented by the network operator to determine if proxying is necessary. The proxying routine may base the determination on static information, such as device type (e.g. manufacturer or model), subscriber status, or provisioning information. Alternatively, in other aspects, the proxying routine may base the determination on dynamic information, such as current network conditions, current network resource availability and/or current state of the open market wireless device, such as geographic location of the device or the like.

An aspect of the innovation is provided for by a method of dynamic source determination of provisioning information on an open market wireless communication device. The method includes receiving an input to launch a network service on an open market wireless communication device and determining if first provisioning information corresponding to the network service is stored on a removable module in communication with the wireless communication device. If the first provisioning information is stored on the removable module, then the method includes launching the network service on the wireless communications device according to the first provisioning information. If the first provisioning information is not stored on the removable module, then the method includes determining if second provisioning information corresponding to the network service is stored in a non-removable memory of the wireless communication device and if the second provisioning information corresponding to the service is stored in the non-removable memory, then the method includes launching the network service on the wireless communications device according to the second provisioning information.

In one aspect of the method, the first provisioning information is associated with the network operator that has provisioned the removable module and is providing the wireless device access to the network controlled by the operator through the removable module. In another aspect, the second provisioning information is associated with a third party network service provider (e.g. a service provider other than the network operator), such as the Original Equipment Manufacturer (OEM) of the open market wireless device or the like.

A further aspect of the method may include receiving the network service from the network service operator associated with the removable module based on launching the network service according to the first provisioning information. Further, receiving the network service from the network operator may be based on a dynamic determination administered by the network service operator not to proxy delivery of the network service to a third party network service provider. The dynamic determination may be based on the open market wireless device profile information, such as make or model, subscriber information or classification, provisioning information or classification, current network conditions, current network resource availability, or current state of the open market wireless device or the like.

A further aspect of the method may include receiving the network service from a third party network service provider according to the first provisioning information. Further, receiving the network service from the third party network service provider may be based on a dynamic determination administered by the network service operator to proxy delivery of the network service to a third party network service provider. The dynamic determination may be based on the open market wireless device profile information, such as make or model, subscriber information or classification, provisioning information or classification, current network conditions, current network resource availability, or current state of the open market wireless device or the like.

Yet a further aspect of the method may include receiving the network service from a third party network service provider, such as an Original Equipment Manufacturer (OEM) or the like, according to the second provisioning information.

A further aspect is defined by at least one processor configured to provide source determination of provisioning information on an open market wireless communication device. The processor includes a first module for receiving an input to launch a network service on an open market wireless communication device and a second module for determining if first provisioning information corresponding to the network service is stored on a removable module in communication with the wireless communication device or if second provisioning information corresponding to the network service is stored in a non-removable memory in the wireless communication device. The processor additionally includes a third module for prioritizing launching of the network service on the wireless communications device first according to the first provisioning information, and secondly according to the second provisioning information.

Another related aspect is provided by a computer program product that includes a computer-readable medium. The medium includes a first set of codes for causing a computer to receive an input to launch a network service on an open market wireless communication device and a second set of codes for causing the computer to determine if first provisioning information corresponding to the network service is stored on a removable module in communication with the wireless communication device or if second provisioning information corresponding to the network service is stored in a non-removable memory in the wireless communication device. The medium additionally includes a third set of codes for causing the computer to prioritize launching of the network service on the wireless communications device first according to first provisioning information and secondly according to the second provisioning information.

Yet another aspect is defined by an apparatus for source determination of provisioning information on a wireless communication device. The apparatus includes means for receiving an input to launch a network service on an open market wireless communication device and means for determining if first provisioning information corresponding to the network service is stored on a removable module in communication with the wireless communication device or if second provisioning information corresponding to the network service is stored in a non-removable memory in the wireless communication device. The apparatus additionally includes means for prioritizing launching of the network service on the wireless communications device first according to first provisioning information and secondly according to the second provisioning information.

A further related aspect is provided for by an open market wireless communication device. The device includes a computer platform including a processor and a non-removable memory in communication with the processor. The device additionally includes a removable module in communication with the processor and operable to store data, one or more network service clients executable by the processor and stored in the non-removable memory and a user interface in communication with the processor and operable to receive an input to launch one of the network service clients on the open market wireless communication device. The device also includes provisioning source determination logic executable by the processor and in communication with the removable module and the non-removable user identity module. In response to the input, the provisioning source determination logic is operable to determine if first provisioning information corresponding to the network service is stored on the removable module or if second provisioning information corresponding to the network service is stored in the non-removable memory. The provisioning source determination logic is further operable to prioritize launching of the network service on the wireless communications device first according to the first provisioning information, and secondly according to the second provisioning information.

In certain aspects, the first provisioning information is associated with the network operator that has provisioned the removable module and is providing the wireless device access to the network controlled by the operator through the removable module. In another aspect, the second provisioning information is associated with a third party network service provider (e.g. a service provider other than the network operator), such as the Original Equipment Manufacturer (OEM) of the open market wireless device or the like.

In certain aspects the device may additionally include a communications module in communication with the processor and operable to receive the network service from the network service operator associated with the removable module based on launching the network service according to the first provisioning information. In a further aspect, the communications module may be operable to receive the network service from the network service operator based on a dynamic determination by the network service operator not to proxy the delivery of the service to a third party network service provider. The dynamic determination not to proxy may be based on at least one of subscriber information, or wireless device profile information or provisioning information, current network conditions, or current network resource availability, or a current state of the wireless device. In alternate aspects, the communications module may be further operable to receive the network service from a third party network service provider based on launching the network service according to the first provisioning information. In such aspects, the communications module may be operable to receive the network service from the third party network service provider based on a dynamic determination by the network service operator to proxy the delivery of the service to a third party network service provider. The dynamic determination to proxy may be based on at least one of subscriber information, or wireless device profile information or provisioning information, current network conditions, or current network resource availability, or a current state of the wireless device. In yet a further aspect, the communications module may be further operable to receive the network service from a third party network service provider, such as an OEM or the like, based on launching the network service according to the second provisioning information.

A further aspect is defined by a method for determining and implementing service proxy requirements on a per network service request basis. The method includes receiving, at a network service provider server, a network service launch request from an open market wireless device. The device includes a removable module that is provisioned by a network operator with provisioning information for the requested network service. The method additionally includes determining if service proxying is necessary for the network service access request. If service proxying is necessary for the network service request, the method includes proxying the network service launch request to a predetermined third party network service provider. If service proxying is not necessary for the network service request, the method includes delivering the requested network service from the network service provider. In one particular aspect of the method, the network service provider server that receives the network service launch request is further defined as a server associated with the network operator.

In one aspect of the method determining if service proxying is necessary is accomplished according to a dynamic determination based on at least one of subscriber information, the open market wireless communication device profile information, provisioning information for the network service, current network conditions, current network resource availability, or current state of the service-requesting open market wireless device. Further, in certain aspects, the need to implement the dynamic determination may be based on a business arrangement with one or more third party network service providers.

A further related aspect is defined by at least one processor configured to provide determination of service proxy requirements on a per network service request basis. The processor includes a first module for receiving a network service launch request from an open market wireless device including a removable module that is provisioned by a network operator with network service provisioning information. The processor additionally includes a second module for determining if service proxying is necessary for the network service launch request and a third module for proxying the network service launch request to a predetermined third party network service provider if the determination is made that service proxying is necessary. The processor also includes a fourth module for delivering the requested network service from the network service provider if the determination is made that service proxying is not necessary.

A computer program product that includes a computer-readable medium defines yet another aspect. The medium includes a first set of codes for causing a computer to receive a network service launch request from an open market wireless device that includes a removable module that is provisioned by a network operator with network service provisioning information. The medium additionally includes a second set of codes for causing the computer to determine if service proxying is necessary for the network service launch request. Also, the medium includes a third set of codes for causing the computer to proxy the network service launch request to a predetermined third party network service provider if the determination is made that service proxying is necessary and a fourth set of codes for causing the computer to deliver the requested network service from the network service provider if the determination is made that service proxying is not necessary.

A further related aspect is defined by an apparatus for dynamic source determination of provisioning information on a wireless communication device. The device includes means for receiving a network service launch request from an open market wireless device. The open market wireless device includes a removable module that is provisioned by a network operator with network service provisioning information. The device additionally includes means for determining if service proxying is necessary for the network service launch request and means for proxying the network service launch request to a predetermined third party network service provider if the determination is made that service proxying is necessary. Additionally, the device includes means for delivering the requested network service from the network service provider if the determination is made that service proxying is not necessary.

A network server defines yet another aspect of the innovation. The network server includes a computer platform including a processor and a non-removable memory in communication with the processor and operable to store data. The server also includes a communications module in communication with the processor and operable to receive a network service launch request from an open market wireless device. The open market wireless device includes a removable module that is provisioned by a network operator with network service provisioning information. The network server additionally includes network service proxying logic executable by the processor and operable to determine if service proxying is necessary for the network service launch request based on a predetermined proxying routine and, if service proxying is necessary, proxying the network service launch request to a predetermined third party network service provider. In certain aspects, the network server is further defined as a server associated with, or otherwise in the control of, the network service operator.

In certain aspects of the network server, the predetermined proxying routine is further operable to determine if service proxying is necessary based on at least one of subscriber information, the open market wireless communication device profile information, provisioning information for the network service, current network conditions, or current available network resources, or a current state of the open market wireless device. In other aspects, the predetermined proxying routine is implemented based on a business arrangement with one or more third party network service providers.

In other aspects of the network server, the communications module may be further operable to receive the network service launch request from the open market wireless device in response to a determination by the wireless device that the removable module includes provisioning information for the network service provider.

Thus, presently described methods, systems and apparatus allow a network operator to control the source for network services in open market devices by provisioning the network operator-issued removable modules with network service provisioning information associated with the operator and configuring the open market wireless devices such that the device looks to the removable module first for the network service provisioning information before looking to device storage for any other provisioning information related to the network service. In this regard, the user of the open market wireless device is still provided access to the network service even if the network operator does not provide the service or provide access to the service. Additionally, the described aspects methods, systems and apparatus provide the network operator with an additional level of dynamic control over the source for network services by providing for a network-side proxying features that allows the network operator to proxy network service requests sent from the open market wireless devices to a designated third party network service provider based on criteria defined by the network operator. The defined criteria may include, but is not limited to, device type (e.g. make and/or model), subscriber info/status, provisioning info/status, current network conditions, current network resource availability, current state of the wireless device or the like.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
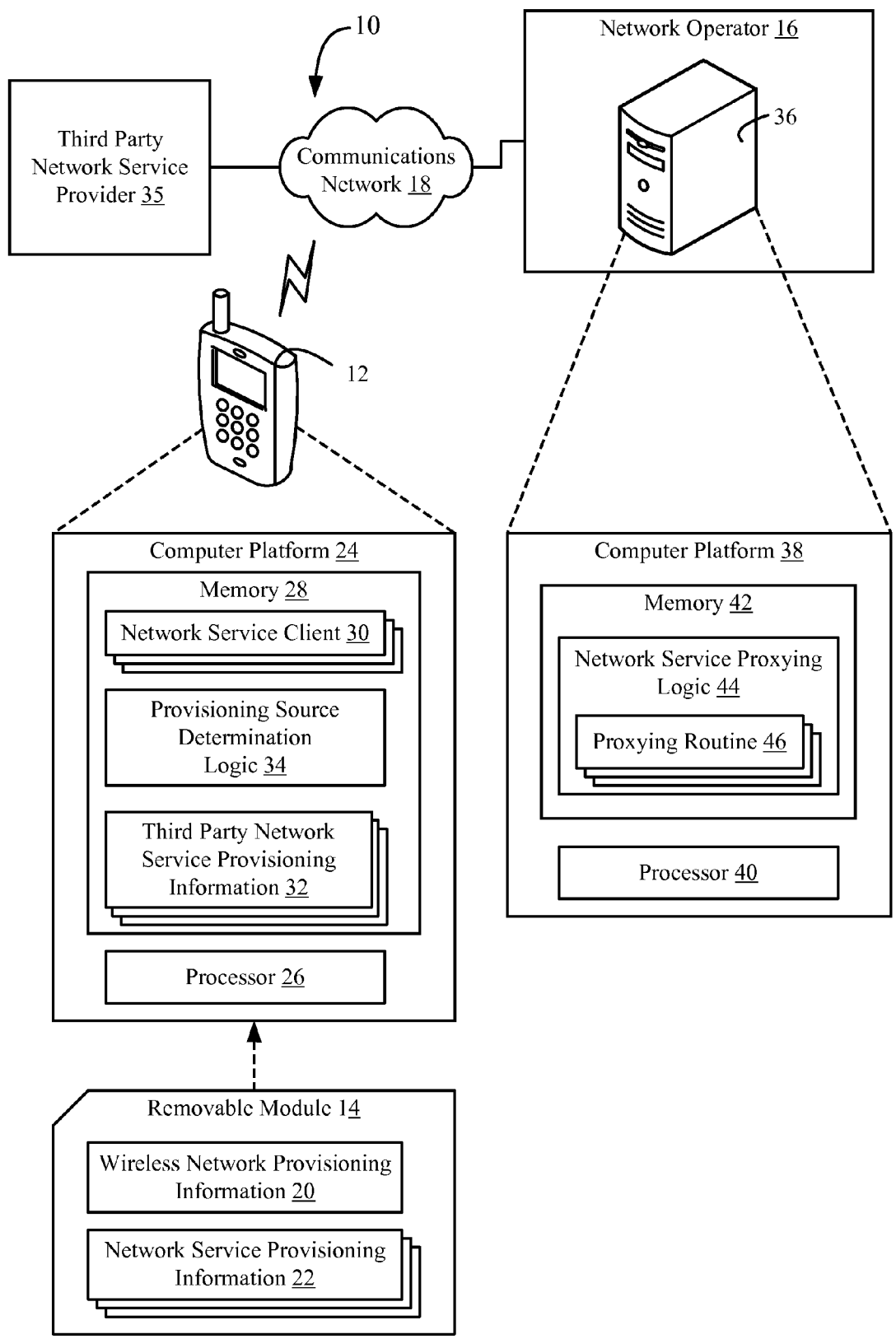
FIG. 1 is a schematic diagram of one aspect of a system for determining a source for provisioning information on an open market wireless device and proxying needs at a network operator.

The present devices, apparatus, methods, computer-readable media and process ors now will be described more fully hereinafter with reference to the accompanying drawings, in which aspects of the innovation are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the innovation to those skilled in the art. Like numeric designators in the figures and the detailed description refer to like elements throughout.

The various aspects are described herein are in connection with a wireless communication device. A wireless communication device can also be called a subscriber station, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Present aspects herein disclose apparatus, methods and systems that provide for network operators to control the source from which open market wireless devices receive network services, such as network download services or the like. One example of a download service is Binary Runtime Environment for Wireless® (BREW®) download services, available from Qualcomm Incorporated of San Diego, Calif. As previously noted, in open market wireless devices the network operator does not have control over the wireless device and, consequently, the software executing on the wireless device. Instead, the network operator has control over the removable module The term "removable module" is used herein to refer to any module that may be inserted or otherwise in communication with a wireless device and provides for storage of information, such as wireless service provisioning information and/or network service provisioning information. This, "removable module" may include, but is not limited to, a Removable User Identity Module (RUIM) for a Code Division Multiple Access (CDMA) system, a CDMA Subscriber Identity Module (CSIM) based on a Universal Integrated Circuit Card (UICC) for a CDMA system, Universal Subscriber Identity Module (USIM) based on a UICC for Universal Mobile Telecommunications System (UMTS), or a Subscriber Identity Module (SIM) in a Global System for Mobile communications (GSM) system or the like.

Since the network operator has control over the removable module, according to present aspects, the removable module will include network service provisioning information, characteristically provisioning information associated with services provided by the network operator and the wireless device will be configured to first look to the removable module for network service provisioning information before subsequently looking to wireless device memory for provisioning information if the removable module is not configured with the provisioning information for the desired network service. In this regard, present aspects allow the user of the open market wireless device to access network services in the instances in which the network operator does not provide the service or provide access to the service.

Additionally, aspects provide for an additional level of network operator control by providing the network operator, or any other service provider, the ability to dynamically determine proxying needs for a given network service request based on one or more device, subscriber, provisioning or network characteristics. In this regard, a network operator may enter into business arrangements with third party network service providers to proxy the delivery of the network service to the third party if the request for service meets the one or more device, subscriber, provisioning or network characteristics.

Referring to FIG. 1, a schematic diagram is provided of a system 10 for source determination of network service provisioning information and determination of proxying needs at the network operator level, according to aspects herein disclosed. The system includes an open market wireless device 12 and an associated removable module 14 that is provisioned and provided by network operator 16 to allow the wireless device to communicate on wireless communication network 18. The removable module is characteristically inserted or otherwise in temporal communication with the wireless device 12 to provide the open wireless device 12 with the requisite wireless network provisioning information 20 needed for the open market wireless device 12 to communicate across wireless communication network 18. Additionally, the removable module 14 may be configured by network operator 16 with network service provisioning information 22 that is operable to provide the wireless device access to an associated network services provided by the network operator 16 or otherwise accessible through the network operator.

The open market wireless device 12 includes a computer platform 24 having at least one processor 26 and memory 28. The memory 28 of open market wireless device 12 includes one or more network service clients 30, which may include a download network service client, such as BREW® or any other network service client. The network services may be provided by the network operator 16 or otherwise accessible via the network operator. Alternatively, the network services may additionally or exclusively be provided by a third party network service provider 35, such as Original Equipment Manufacturer (OEM) network service provider or the like. A third party network service provider 35 as herein defined includes any service provider other than the network operator. Thus, the memory 28 of open market wireless device 12 may include third party network service provisioning information 32 that is operable to provide the wireless device 12 access to an associated network service provided by the third party.

The memory 28 of open market wireless device 12 additionally includes network service provisioning source determination logic 34 operable to determine a source for network service provisioning information upon receiving a command for initiating the launch of a network service client 30 on the wireless device 12. While network service provisioning source determination logic 34 is shown in FIG. 1 and described as being in memory 28 it may also possible, and is within the bounds of present aspects, to provide for logic 34 as a subsystem of processor 26. The network service provisioning source determination logic 34 is configured to first determine if the removable module 14 includes the network service provisioning information 22 associated with the network service being launched and, if the removable module 14 includes the associated network service provisioning information 22, implement that provisioning information to launch the network service on the wireless device 12. If the removable module 14 does not include the provisioning information for the requested network service, then network service provisioning source determination logic 34 determines if the memory 28 of network device 12 includes third party network service provisioning information 32 associated with the network service being launched and, if the memory 28 includes the associated network service provisioning information 32, implement that provisioning information to launch the network service on the wireless device 12.

In this regard, the network service provisioning source determination logic 34 provides the network operator 16 operate with assurance over the source of the network service by first looking to the removable module 14 for provisioning information before subsequently looking to the memory 28 of the device 12 if the removable module 14 does not include provisioning information for the requested network service. This allows the device 12 to gain access to the network service through a third party network service provider 35 even though the network operator may not provide the service or provide access to the service or even though the removable module 14 may not be configured with the necessary network service provisioning information.

Additionally, system 10 includes network server 36, which as illustrated in FIG. 1 may be a server controlled by network operator 16. The network server 36 includes a computer platform 38 having at least one processor 40 and a memory 42. The memory 42 of network server 36 additionally includes network service provider proxying logic 44 that includes predetermined proxying routine 46 operable to determine if proxying of a network service launch request is necessary and, if necessary, proxy the request to a designated third party, such as network service provider 35 or the like. In one aspect, network operator 16 may implement network service proxying based on predetermined business arrangements with one or more third party service providers 35. It should be noted that while FIG. 1 illustrates only one third party network service provider 35, which may provide network service according to third party provisioning information 32 stored on the device 12 or may be proxied network service as determined by network operator 16, different third party network service providers are maintained in the network 14, such that third party provisioning information 32 may be associated with one or more third party network service providers 35 and the network operator 16 may proxy network service to another one or more third party network service providers 32 or a subset of the network service providers associated with third party provisioning information 32. Additionally, while network service provider proxying logic 44 is shown in FIG. 1 and described as being in memory 42 it may also possible, and is within the bounds of present aspects, to provide for logic 42 as a subsystem of processor 40.

The predetermined proxy routine 46 may be configured to proxy network service requests based on one more device, subscriber, provisioning and/or network characteristics. For example, proxying may be based on the make and/or model of the open market wireless device, or the level, and/or status of the subscriber (e.g. gold level subscribers do/do not get proxied), and/or other profile data related to the subscriber (e.g. male subscribers in the 35-45 year old range do/do not get proxied). In other examples, proxying may be based or dynamic conditions such as current network conditions, current network resource availability and/or current state of the open market wireless device (e.g. devices within a defined geographic boundary do/do not get proxied) or the like.

In this regard, the ability of the network operator to proxy network service requests provides an additional level of source control for the network operator. Proxying allows the network operator 16 to control whether the network operator 16 provides the service to the open market wireless device 12 or, alternatively, whether a third party 30 provides the network service to the device 12. Additionally, when used in conjunction with the provisioning source determination at the wireless device level, proxying at the network operator server level, allows the network operator to control the source of the network service in instances in which the network operator does not provide the service. For example, the network operator can configure the removable module 14 to include network service provisioning information 22 for a particular network service that the network operator does not provide. Since the provisioning source determination on the wireless device is configured to look first at the removable module for the provisioning information, the wireless device will retrieve and implement the provisioning information from the removable module without having to resort to looking for and implementing any possible third party network service provisioning information on the wireless device. Once the network server receives the request for the service, the network service provider proxy logic may be configured such that all requests are proxied to designated third party network service providers because the network operator does not provide the service. As such, in this example, the network operator can control the source of third party service provider as opposed to having the OEM of the wireless device control the third party service provider based on the third party provisioning information stored on the device.

Figure 2:
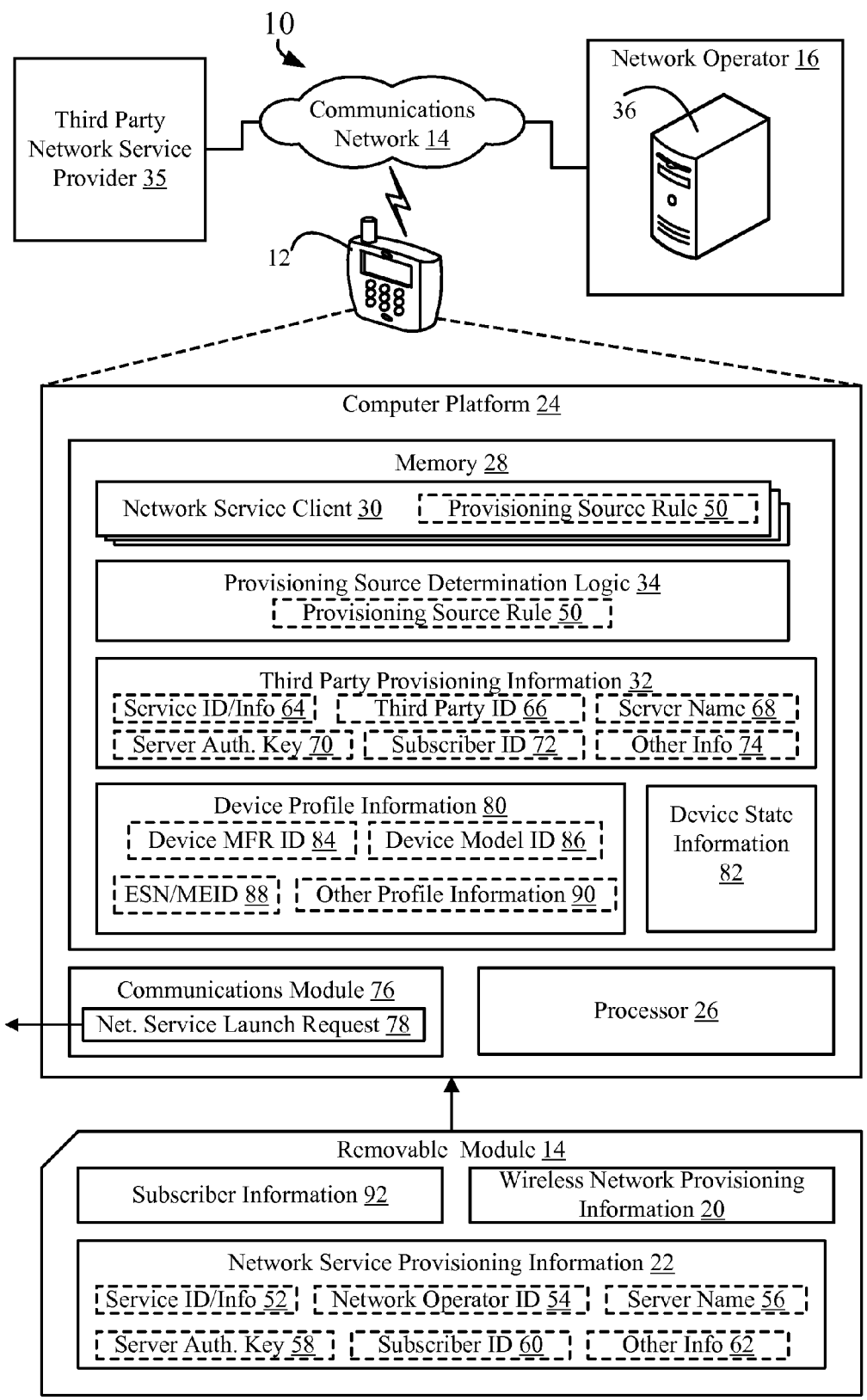
FIG. 2 is a schematic diagram of an open market wireless device for determining a source for provisioning information, according to another aspect.

FIG. 2 provides for another more detailed aspect of system 10, specifically highlighting detailed and optional aspects of the open market wireless device 12 and associated removable module 14. As previously described, system 10 includes an open market wireless device 12 operating on a communications network 18 under control of a network operator 16.

The memory 28 of wireless device 12 includes one or more network service clients 30 operable to launch the associated network service on the wireless device and provisioning source determination logic 34 operable to determine the source of the provisioning information necessary for launching a network service. The provisioning source determination logic 34 may include the provisioning source rule 50 that is used to determine the source of the provisioning information. For example, the provisioning rule according to certain aspects, is that the device looks to the removable module 14 first for provisioning information 22 and, if provisioning information 22 is not found on the removable module 14, looks to device memory 28 for the provisioning information 32. In alternate aspects, each of the network service clients 30 may be configured with a provisioning source rule 50, such that each network service client 30 may be configured with their own specific provisioning rule 50. For example, one or more network service clients 30 may be configured with a rule that provides for the device to look to the removable module 14 first for provisioning information 22 and, if provisioning information 22 is not found on the removable module 14, look to device memory 28 for the provisioning information 32, while other clients 30 may be configured with a rule that provides for the device to look to the device memory 28 first for provisioning information 32 and, if provisioning information 22 is not found on the device memory 28, look to the removable module 14 for the provisioning information 22.

As previously noted, the removable module 14 may include provisioning information 22 for one or more network services that provides necessary information for accessing the service. In most aspects, provisioning information 22 will be associated with a network service provided for by the removable module—issuing network operator and accessible through the removable module—issuing network operator. Provisioning information 22 may include network service identifier/network service information 52, network operator identifier 54, server name 56, server authorization key 58, subscriber identifier 60 or other provisioning information 62, such as Domain Name Server (DNS) look-up identifier or the like.

Additionally, as previously noted, the memory 28 of the wireless device 12 may include third party provisioning information 32 that provides the necessary information for accessing the service. Similar to provisioning information 22 stored on the removable module 14, provisioning information 32 may include network service identifier/network service information 64, third party service provider identifier 66, server name 68, server authorization key 70, subscriber identifier 72 or other provisioning information 74, such as Domain Name Server (DNS) look-up identifier or the like.

The wireless device 12 includes a communication module 76 operable to provide for internal communications within the wireless device 12 and external communications with the associated removable module 14. The communications module 76 also is operable to provide for wireless communication with the wireless network designated in the wireless network provisioning information 20 stored on the removable module 14. Additionally, the communications module is operable to communicate network service launch requests 78 to either the network operator service provider 16 or a designated third party network service provider 35 depending on which provisioning information is used to launch the service.

Additionally, the network service launch request 78 may include other information that is used by the network operator 16 or some other service provider to determine the need to proxy the request. Alternatively, the other information that is used by the network operator 16 or some other service provider to determine the need to proxy may be communicated in another separate communication prior to or after communicating the network service launch request. Additionally, the other information may be data that is acquired by the network provider through other means, stored in a network database and accessible by the network operator at the time for proxying determination. The other information used to determine the need to proxy the request may be included within device profile information 80, device state information 82 or any other file or data store within memory 28. The device state information 82 may include dynamic information on the current state of the wireless device, such as the current geographic position/location of the device or any other information related to the state of the device.

The device profile information may include the device manufacturer identifier 84, the device model identifier 86, the Electronic Serial Number (ESN) or Mobile Equipment Identifier (MEID) 88 or other profile information 90. In one aspect, in which device profile information 82 is used to determine the need to proxy the service request, the profile information may be communicated in advance of the network service launch request 78. See, for example, U.S. patent application Ser. No. 12/385,121, entitled "Apparatus and Methods for Network Identification of Open Market Wireless Devices," assigned to the same assignee as the present aspects and previously incorporated by reference as is set forth fully herein. The incorporated application provides for the device profile information to be communicated to the network operator upon initial insertion of the removable module in the wireless device.

In addition to information stored on the memory 28 of the wireless device 12, proxy determination may rely on other information stored on the removable module 14 and included in the network service launch request 78 or some other wireless communication between the device and the network operator. Thus, removable module 14 may include subscriber information 92, which may include the service level provided to the subscriber or any other information characteristic of the subscriber. Additionally, subscriber/user profile data may be stored and accessible on the wireless device 12

Figure 3:
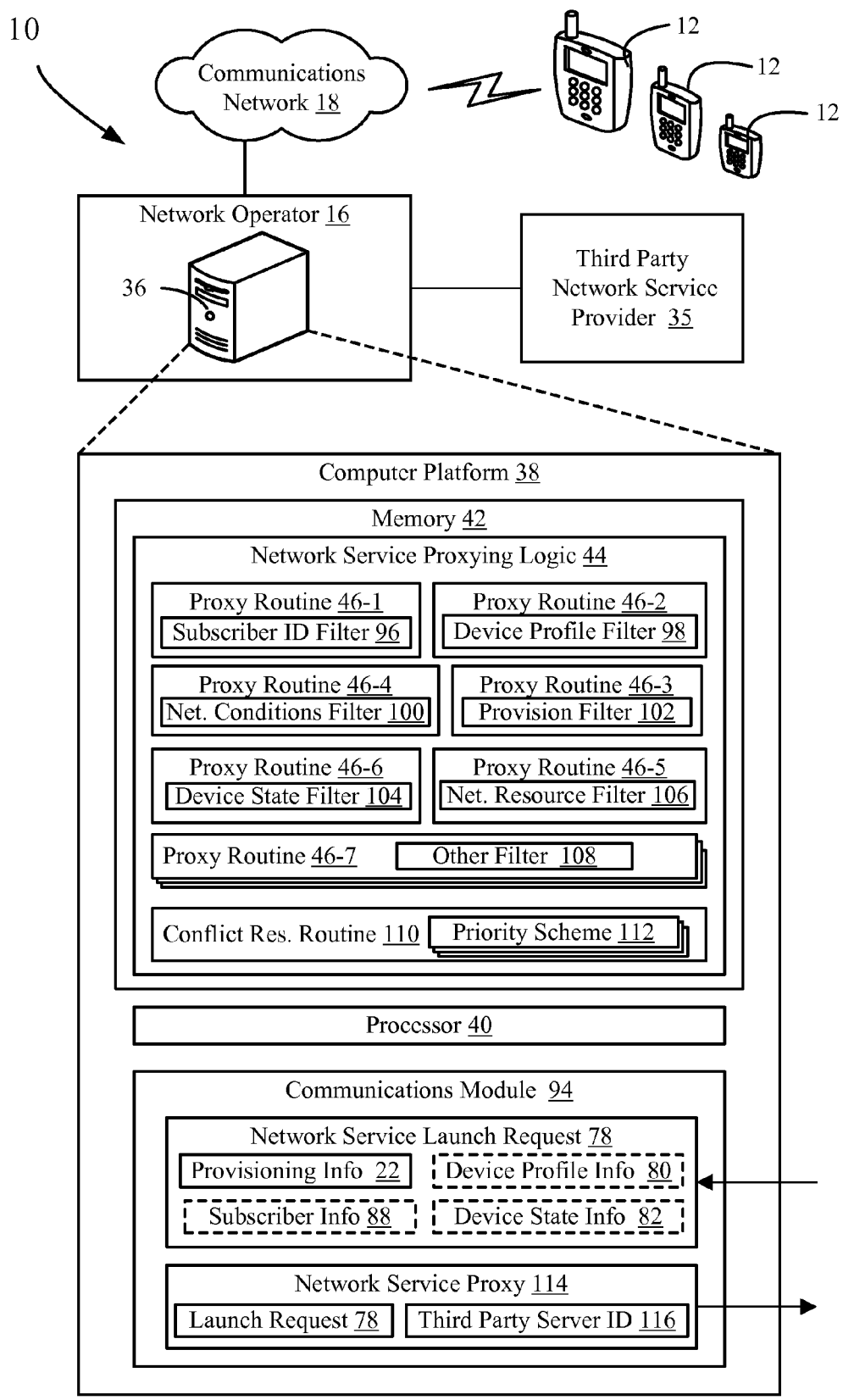
FIG. 3 is schematic diagram a network device for determining network service proxying needs for open market wireless devices, according to another aspect.

FIG. 3 provides for another more detailed aspect of system 10, specifically highlighting detailed and optional aspects of the network server 36. As previously described, system 10 includes a network operator 16 including one or more network servers 36 that are operable to receive network service launch requests 78 from open market wireless devices 12 and determine whether proxying of the request is necessary.

Thus, network server 36 includes a communication module 94 in communication with processor 40 and operable for receiving the network service launch requests 78 from the open market wireless devices 12. In addition to including the network service provisioning information 22 needed to access and authorize the network service the launch request 78 may optionally other information relevant to the proxy decision process. For example, the launch request 78 may include subscriber information 94, device profile information 78, device state information 82 or any other information. As previously noted the other information relevant to the proxy decision process may be communicated to the network server outside of the launch request in separate communications sent either before or after the launch request. In this regard, the network server may in communication with network databases (not shown in FIG. 3) that provide storage for subscriber information, device profile information and the like.

The memory 42 of network server 36 includes network service proxying logic 44, which is executable by processor 40 and operable to determine if proxying is required for the launch request 78. As previously noted if the network operator 16 does not provide the service or the service is currently unavailable from the network operator 16, all launch requests 78 for that particular network service will be proxied to a third party network service provider 35. The network service proxying logic 44 may include one or more proxy routines 46-1-46-7 that are implemented to determine if proxying of the launch request is necessary and, if it is necessary, to which third party service provider the service should be proxied to. In this regard each proxy routine 46-1-46-7 may be configured with a proxy characteristic filter and at least one third party network service provider associated with the proxy routine.

In the illustrated example of FIG. 3, the network service proxying logic 44 may include proxy routine 46-1 that includes a subscriber ID filter 96 operable to determine proxying of launch requests 78 based on subscriber identifiers or information related to subscribers (for example, a certain gender, age group or interest group of subscribers). The network service proxying logic 44 may also include proxy routine 46-2 that includes a device profile filter 98 operable to determine proxying of launch requests 78 based on device profile information, such as manufacturer/maker, model number or serial number. Additionally, the network service proxying logic 44 may include proxy routine 46-3 that includes a provision filter 102 operable to determine proxying of launch requests 78 based on wireless network provisioning information and/or network service provisioning information provisioned in the removable module 14 associated with the open market wireless device 12.

In addition to static information, such as subscriber information, device information and/or provisioning information, the proxying logic 44 may implement routines 46 that filter for proxying based on dynamic information, such as current network conditions, current network resource availability and/or current state of the wireless device. Thus proxying routines 46 may additionally include, as shown in the example of FIG. 3, proxy routine 46-4 that includes a network condition filter 100 operable to determine proxying of launch requests 78 based on current network conditions, such as network load and the like. In this aspect, the network server 36 may additionally have access to a network database (not shown in FIG. 3) that logs and tracks the necessary parameters related to current network conditions. The proxying logic 44 may also include proxy routine 46-5 that includes a network resource filter 106 operable to determine proxying of launch requests 78 based on current availability of network resources, such as network service delivery server, bandwidth and the like. In this aspect, the network server 36 may additionally have access to a network database (not shown in FIG. 3) that logs and tracks the necessary parameters related to current network resource availability. Additionally, the proxying logic 44 may also include proxy routine 46-6 that includes a device state filter 104 operable to determine proxying of launch requests 78 based on a current state/condition of the wireless device, such as geographic position/location of the device or the like. In such aspects, the wireless device state information 82 may be communicated in a launch request 78 or in a separate communication. Additionally, the proxy logic 44 may be configured with any other proxy routine 46-7 that includes another filter 108.

It should be noted that in certain instances the proxying logic 44 may determine that the launch request 78 necessitates proxying based on two or more proxying routines 46. In such instances it may be possible that each proxy routine is associated with a different third party network service provider 35. In this instance the proxy logic 44 may additionally include a conflict resolution routine 110 operable to resolve proxying conflict based on one or more priority schemes 112 if the logic 44 determines that proxying is necessitated based on two or more proxying routines 46 and at least two of the routines 46 are associated with different third party network service providers 35.

Thus, once the need to proxy is determined by proxying logic 44, the communication module 94 is further operable to communicate a network service proxy 114 that includes at least a portion of the launch request 78 and a third party network service identifier/address 116 as determined or identified by the proxying logic 44.

Figure 4:
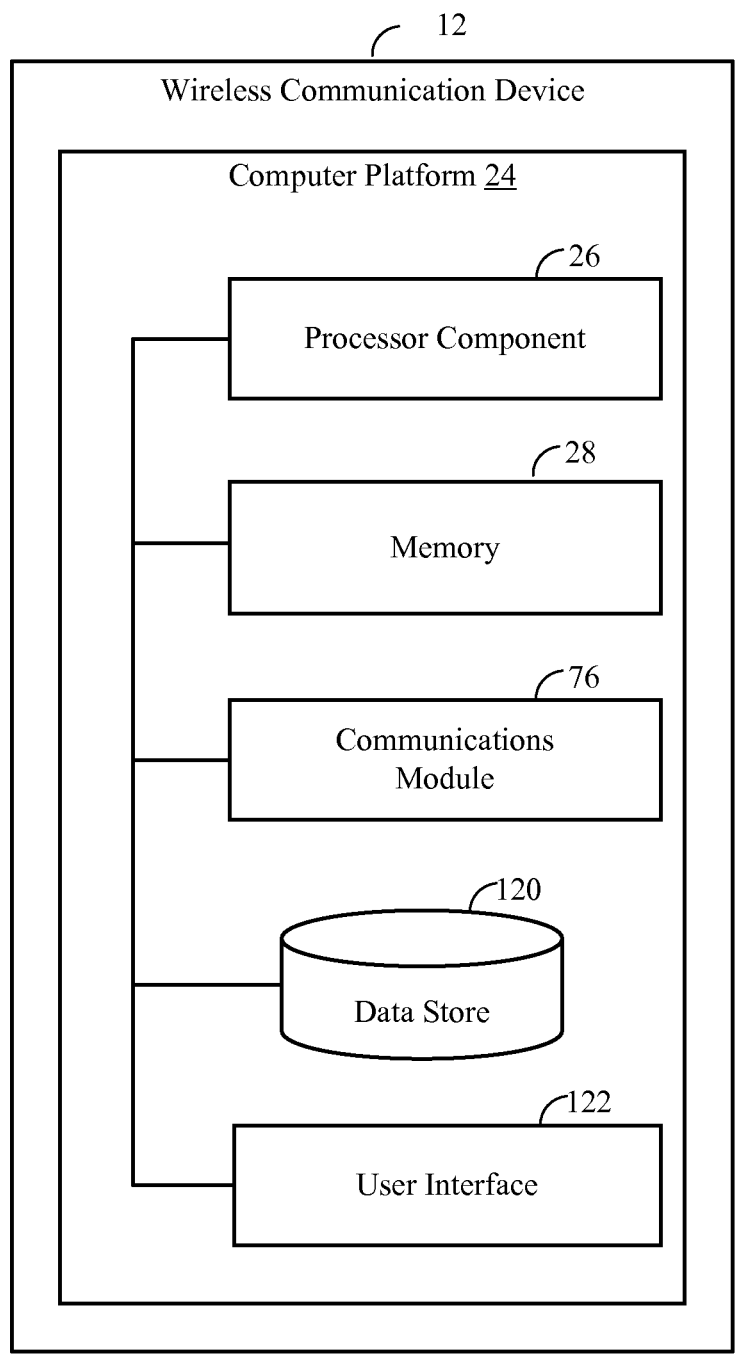
FIG. 4 is a schematic diagram of one aspect of a wireless communication device operable as described herein.

Referring to FIG. 4, in one aspect, open market wireless communications device 12 includes a mobile communication device, such as mobile telephone or the like, operable on a wireless communication system. As can be appreciated, there are a variety of wireless communication systems, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

As previously noted, wireless communications device 12 includes processor component 26 for carrying out processing functions associated with one or more of components and functions described herein. Processor component 26 can include a single or multiple set of processors or multi-core processors. Moreover, processing component 26 can be implemented as an integrated processing system and/or a distributed processing system. Additionally, processing component 26 may include one or more processing subsystems, such as processing subsystems capable of determining provisioning information source according to present aspects, determining geographic location, such as GPS or the like or any other processing subsystem needed to carry out present aspects.

Wireless communications device 12 further includes a memory 28, such as for storing local versions of applications/modules being executed by processor component 28. Memory 28 can include random access memory (RAM), read only memory (ROM), and a combination thereof. Additionally, in some aspects (not shown in FIG. 4), memory 28 includes network service clients 30, provisioning source determination logic 34, third party provisioning information 32 and/or wireless device profile information 80.

Further, wireless communications device 12 includes a communications module 76 that provides for establishing and maintaining communications with one or more parties utilizing hardware, software, and services as described herein. Communications module 76 may carry communications between components on wireless communications device 12, as well as between wireless communications device 12 and external network devices, such as network server 36, located across a communications network and/or devices serially or locally connected to wireless communications device 12, such as removable module 14.

Additionally, wireless communications device 12 may further include a data store 120, which can be any suitable combination of hardware and/or software that provides for mass storage of information, databases, and programs employed in connection with aspects described herein. Optionally, in some aspects, (not shown in FIG. 4) data store 120 may include network service clients 30, provisioning source determination logic 34, third party provisioning information 32 and/or wireless device profile information 80.

Wireless communications device 12 may additionally include a user interface component 122 operable to receive inputs from a user of wireless communications device 12, and to generate outputs for presentation to the user. User interface component 122 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. In particular, user interface components, may include a component suitable for initiating the launch of network service clients 30. Further, user interface component 122 may include one or more output devices, including but not limited to a display, a speaker, a haptic feedback mechanism, a printer, any other mechanism capable of presenting an output to a user, or any combination thereof.

Figure 5:
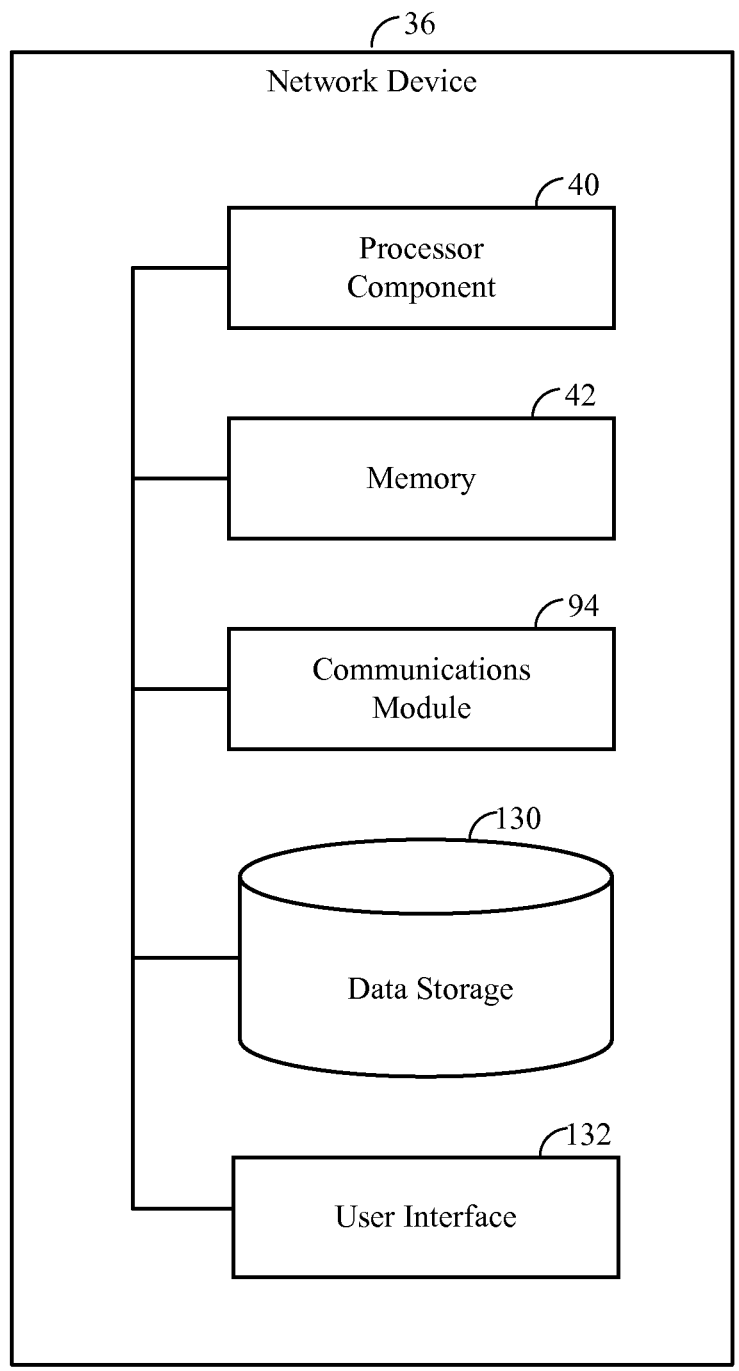
FIG. 5 is a schematic diagram of one aspect of a network device operable as described herein.

Referring to FIG. 5, in one aspect, network server 36 is operable to receive network service launch requests from open market wireless devices and determine if service proxying is necessary. Network server 36 includes any type of network-based communication device, such as a network server operable on a communication network 14. Communication network 14 may be a wired or wireless communication system, or a combination of both, and includes the wireless network on which open market wireless device 12 operates.

Network server 36 includes a processor component 40 for carrying out processing functions associated with one or more of components and functions described herein. Processor component 40 can include a single or multiple set of processors or multi-core processors. Moreover, processor component 40 can be implemented as an integrated processing system and/or a distributed processing system.

Network server 36 further includes a memory 42, such as for storing local versions of applications being executed by processor component 40. Memory 42 can include random access memory (RAM), read only memory (ROM), and a combination thereof Optionally, in some aspects, memory 42 includes network service proxying logic 44 and one or more proxying routines 46 and the like.

Further, network server 36 includes a communications module 94 that provides for establishing and maintaining communications with one or more parties utilizing hardware, software, and services as described herein. Communications module 94 may carry communications between components on network server 36, as well as between network server 36 and external devices, such as wireless communication device 12, and including devices located across communications network 14 and/or devices serially or locally connected to network server 36. In one aspect, communications module 94 is operable for receiving network service launch requests 78, sending proxy requests to third party network service providers 35 and delivering network services to open market wireless devices and the like.

Additionally, network server 36 may further include storage devices 130, which can be any suitable combination of hardware and/or software that provides for mass storage of information, databases, and programs employed in connection with aspects described herein. In certain aspects, storage devices 130 may store the network service proxying logic 44 and one or more proxying routines 46 and the like.

Network server 36 may additionally include a user interface component 132 operable to receive inputs from a user of network server 36, and to generate outputs for presentation to the user. User interface component 132 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 132 may include one or more output devices, including but not limited to a display, a speaker, a haptic feedback mechanism, a printer, any other mechanism capable of presenting an output to a user, or any combination thereof.

Figure 6:
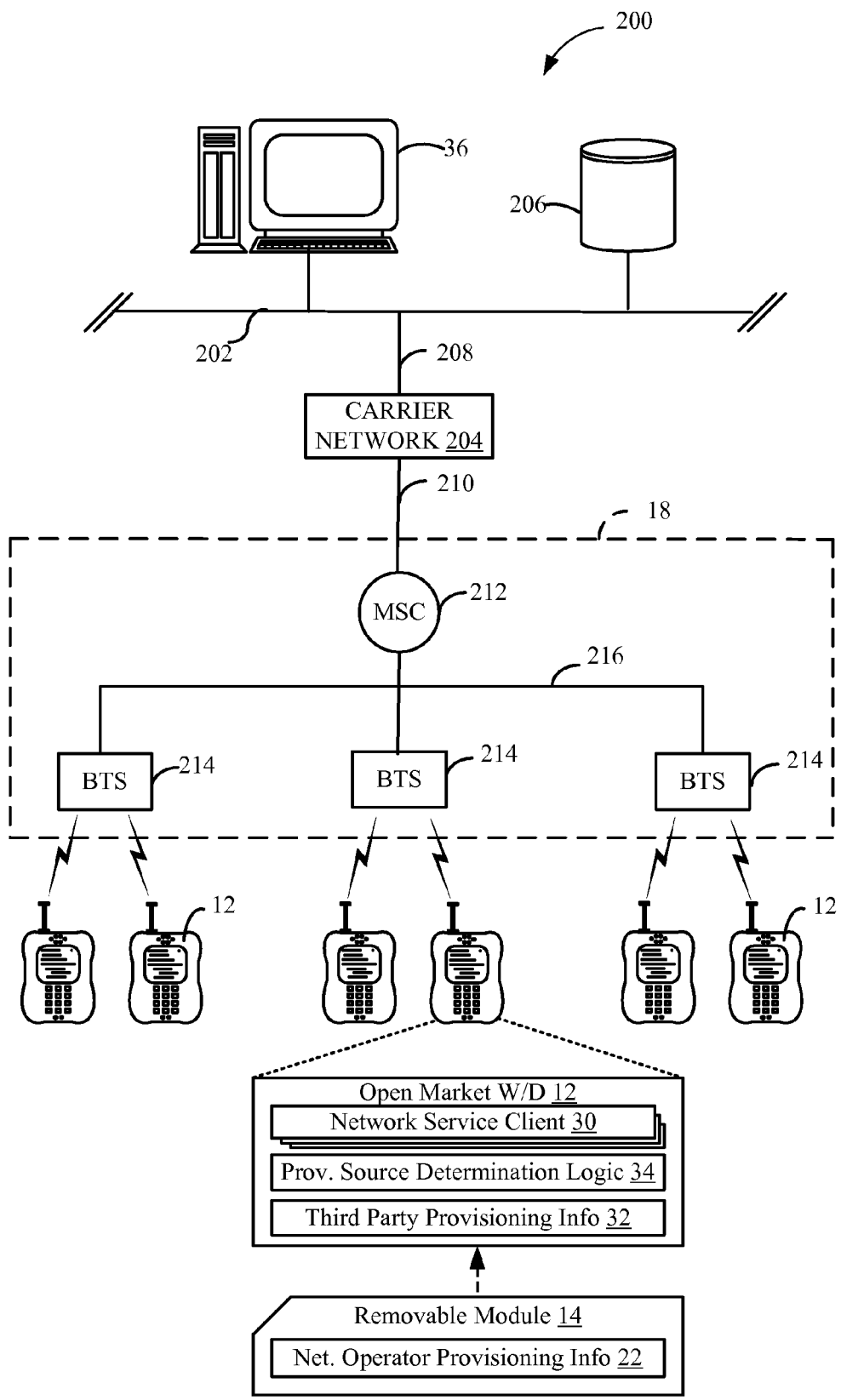
FIG. 6 is a schematic diagram of a wireless network, specifically a cellular network used in conjunction with present aspects.

FIG. 6 represents a block diagram of a cellular network 200, which may be used in conjunction with present aspects to communicate wireless messages. A wireless network 18 may be included within cellular network 200 and, as such may be implemented to communicate the device identification messages from the wireless devices/removable modules to the network operator and the device identification request messages from the network operator to the wireless devices/removable modules. Referring to FIG. 6, in one aspect, open market wireless device 12 comprise a wireless communication device, such as a cellular telephone. In present aspects, wireless communication devices are configured to communicate via the cellular network 200. The cellular network 200 provides wireless communication device 12 the capability to communicate communication data packets, such as SMS data packets or other messaging data packets. The cellular telephone network 200 may include wireless network 18 connected to a wired network 202 via a carrier network 204. FIG. 6 is a representative diagram that more fully illustrates the components of a wireless communication network and the interrelation of the elements of one aspect of the present system. Cellular telephone network 200 is merely exemplary and can include any system whereby remote modules, such as wireless communication devices 12 communicate over-the-air between and among each other and/or between and among components of a wireless network 18, including, without limitation, wireless network carriers and/or servers.

In network 200, network device 36, such as a network server, can be in communication over a wired network 202 (e.g. a local area network, LAN). Further, a network database/storage device 206 may be in communication with network device 36 via the wired network 202. Network device 36 may receive and/or generate and communicate communication data packets, such as SMS message data packets to and from the open market wireless devices 12. Network device 36 and database 206 may be present on the cellular telephone network 200 with any other network components that are needed to provide cellular telecommunication services. Network device 36 and database 206 communicate with carrier network 204 through a data links 208 and 210, which may be data links such as the Internet, a secure LAN, WAN, or other network. Carrier network 204 controls messages (generally being data packets) sent to a mobile switching center ("MSC") 212. Further, carrier network 204 communicates with MSC 212 by a network 210, such as the Internet, and/or POTS ("plain old telephone service"). Typically, in network 210, a network or Internet portion transfers data, and the POTS portion transfers voice information. MSC 212 may be connected to multiple base stations ("BTS") 214 by another network 216, such as a data network and/or Internet portion for data transfer and a POTS portion for voice information. BTS 214 ultimately broadcasts messages wirelessly to the wireless communication devices 12, by short messaging service ("SMS"), or other over-the-air methods.

Figure 7:
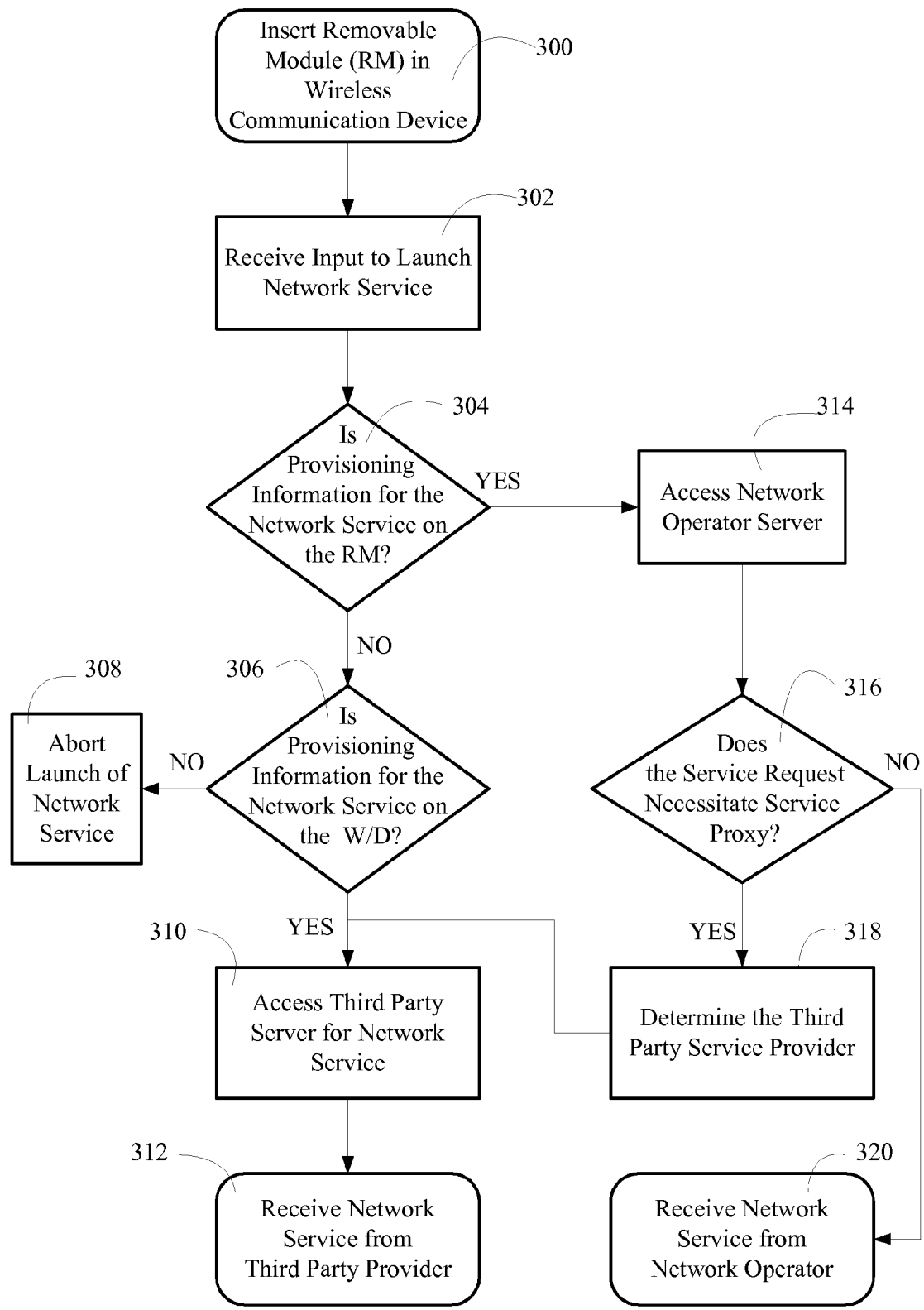
FIG. 7 is a flow diagram depicting a method for determining a source for provisioning information on an open market wireless device and proxying needs at a network operator, according to aspects herein described.

Referring to FIG. 7, a flow diagram is depicted of a methodology for network service provisioning source determination at an open market wireless device and proxying determination at a network operator server, in accordance with an aspect of the present innovation. At Event 300, a removable module is inserted or otherwise placed in communication with an open market wireless communication device. The removable module includes configuration to enable the removable module to communicate with a wireless network in control of the network operator and may additionally include provisioning information for one or more network services.

At Event 302, the open market wireless device receives an input, such an input by a user to a designated input mechanism, to launch a chosen network service, such as a download network service, for example BREW® or the like.

At Decision 304, the wireless device determines if provisioning information for the chosen network service is stored on the removable module. In most aspects, the network service provisioning information stored on the removable module will be associated with a network operator provided network service. As such, the network service provisioning information stored on the removable module will provide for the wireless device to access a network operator server to initiate the launch of the service on the wireless device.

If the wireless device determines that no provisioning information exists on the removable module for the chosen network service then, at Decision 306, the wireless device determines if provisioning information for the chosen network service is stored on the non-removable memory of the wireless device. If the wireless device determines that no provisioning information exists on the non-removable memory of the wireless device then, at Event 308 the launch of the network service is aborted because neither the removable module or the wireless device have the required provisioning information. If the wireless device determines that provisioning information does exists on the non-removable memory of the wireless device then, at Event 310, the wireless device communicates a launch request to a server associated with a third party network service provider, as defined by the wireless device provisioning information, to further initiate the launch of the service on the wireless device. At Event 312, once the launch request has been received by the third party server and authorized, the open market wireless device receives the service from the third party network service provider.

If, at Decision 304, the wireless device determines that provisioning information exists on the removable module for the chosen network service then, at Event 314, the wireless device communicates a launch request to a server associated with the network operator, as defined in the provisioning information, to further initiate the launch of the network service. At Decision 316, the network operator server determines if the launch request necessitates proxying the launch request to a third party network service provider. As previously noted the proxying determination may be based on one or more characteristics/parameters related to the open market wireless device, the subscriber, the provisioning information, the network or the like. If the network server determines that proxying of the launch request is necessary, at Event 318, the network server determines the third party service provider that the launch request is to be proxied to. In some aspects, the network operator will have a predetermined arrangement with one or more third party network service providers based on a business arrangement. Additionally, the chosen third party network service provider may be dictated by the conditions/parameters that were used to determine the need to proxy. For example, if the need to proxy is based on wireless device profile information, for example the manufacturer of the wireless device, the launch request may be proxied to a first third party network service provider and if the need to proxy is based on subscriber information, for example the age group to which the subscriber belongs, the launch request may be proxied to a second third party network service provider. Once the third party network service provider is determined, at Event 310 the network server will proxy the request to the third party server and, at Event 312, the open market wireless device receives the service from the third party network service provider.

If the network server determines that proxying of the launch request is not necessary, at Event 320, the wireless device receives the network service from the network operator.

Figure 8:
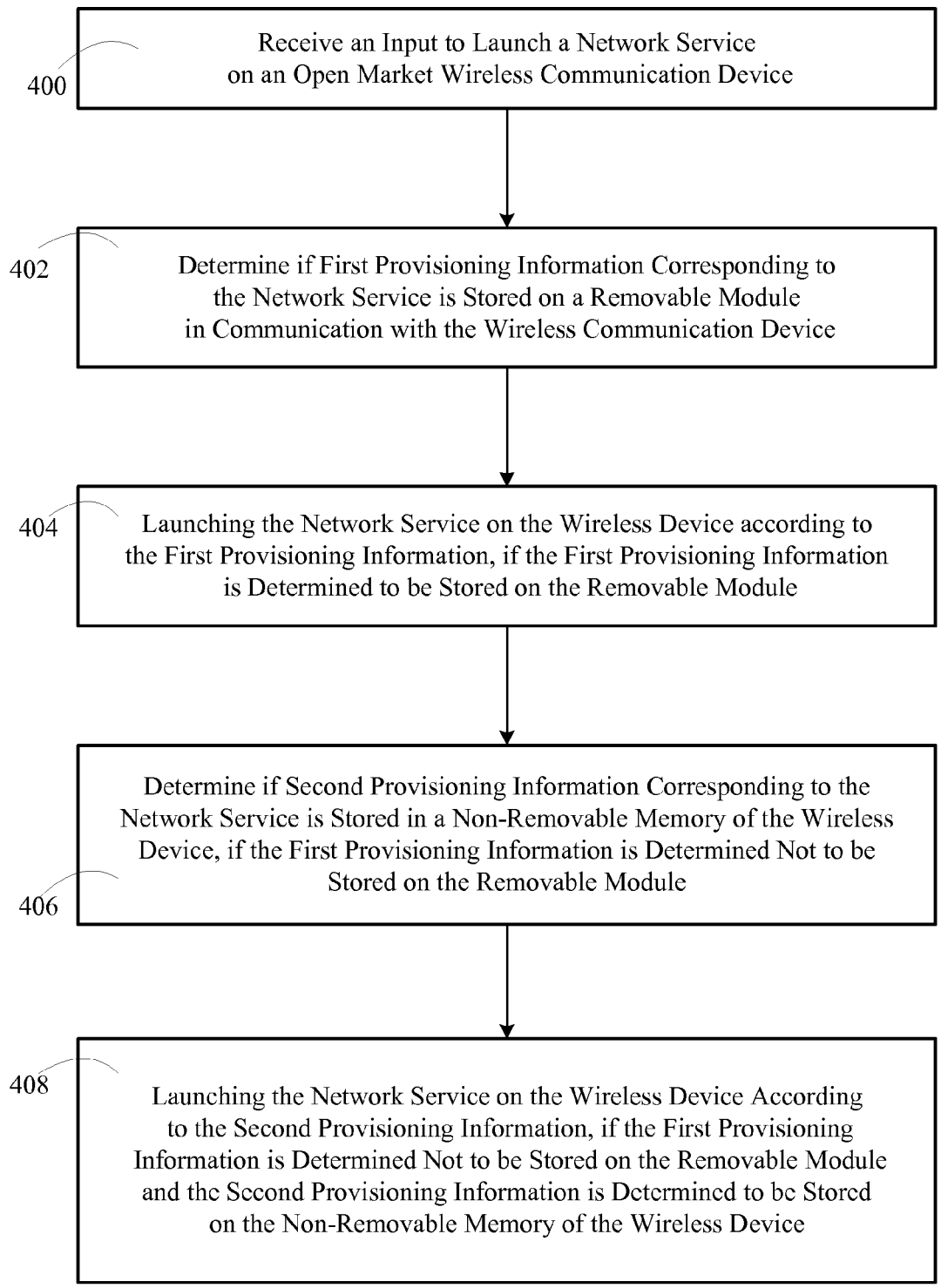
FIG. 8 is flow diagram of a method for determining a source for provisioning information on an open market wireless device, in accordance with present aspects herein disclosed.

FIG. 8 is another flow diagram of a methodology for network service provisioning source determination at an open market wireless device, according to another aspect of the present innovation. At Event 400, the open market wireless device receives an input to launch a network service on an open market wireless communication device. The input is characteristically a user input to a predetermined input mechanism. The network service may be any network service, such as a network download service or the like.

At Event 402, based on the input to launch the network service, a determination is made as to whether the removable module that is currently in communication with the wireless device stores first provisioning information corresponding to the network service. The removable module may be in communication with the wireless device by being inserted or otherwise received by the wireless device or in any other known means whereby the wireless device can access the data stored on the removable module. In some aspects, the first provisioning information is associated with the network operator that has issued/provisioned the removable module.

If the first provisioning information is determined to be stored on the removable module then, at Event 404, the network service is launched on the wireless device according to the first provisioning information. If the first provisioning information is associated with the network operator then the service is delivered from the network operator or, if proxied at the network operator level, the network service may be delivered from a third party network service provider.

If the first provisioning information corresponding to the network service is not determined to be stored on the removable module then, at Event 406, a determination is made as to whether the non-removable (i.e., permanent) memory of the wireless device stores second provisioning information corresponding to the network service. The second provisioning information may be associated with the OEM of the wireless device or some other third party network service provider capable of delivering the network service.

If the first provisioning information is determined not to be stored on the removable module and the second provisioning information is determined to be stored on the non-removable memory of the wireless device, at Event 408, the network service is launched on the wireless device according to the second provisioning information. If the second provisioning information is associated with the OEM or some other third party network service provider then the service is delivered from the OEM or the third party network service provider.

Figure 9:
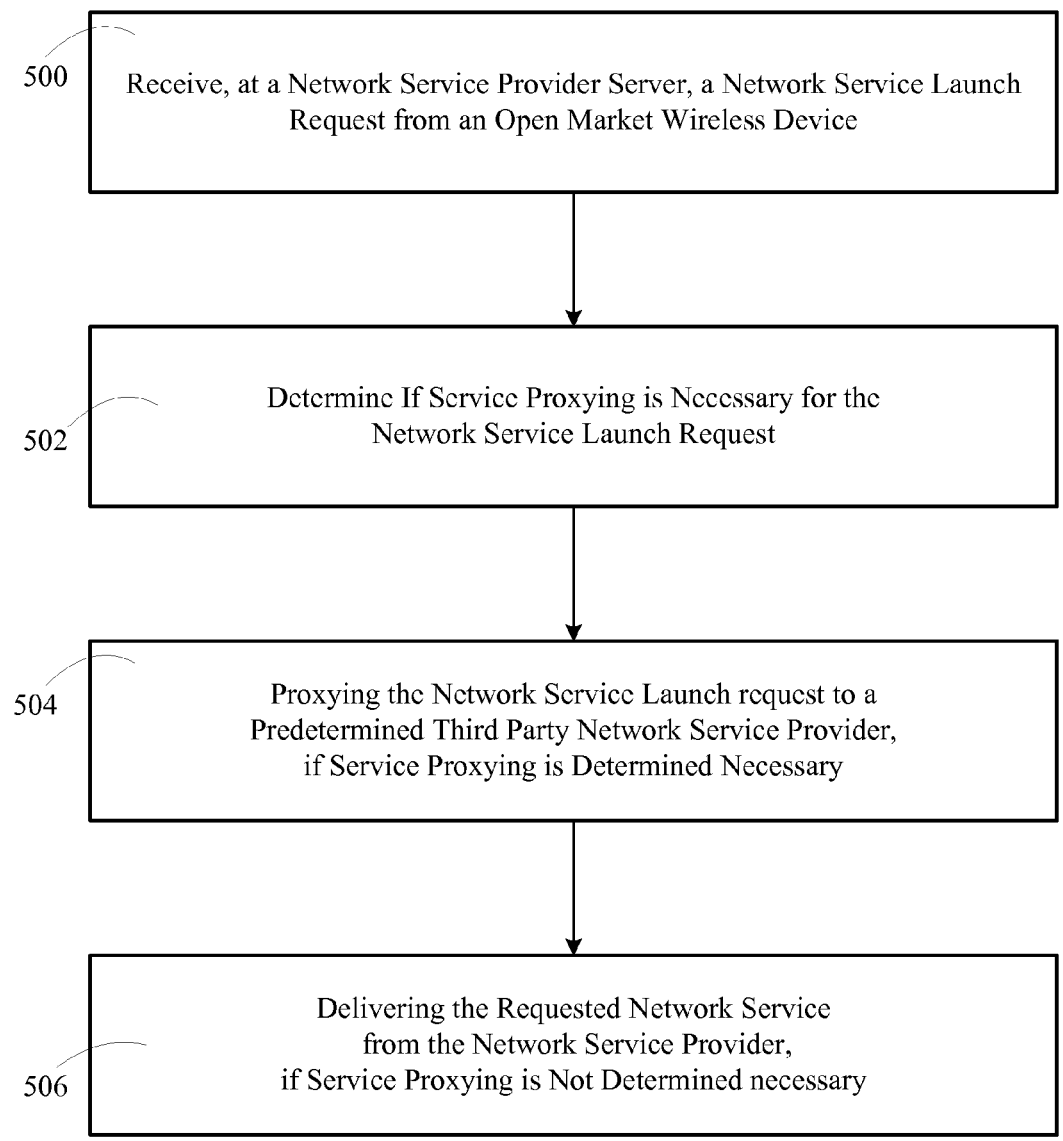
FIG. 9 is a flow diagram of a method for determining proxying needs for the launching of network services on open market wireless devices, according to aspects herein disclosed.

FIG. 9 is another flow diagram of a methodology for determining network service proxying needs at a network server for launch requests from open market wireless devices, according to another aspect of the present innovation. At Event 500, a network service provider server, such as a network operator server, receives a network service launch request from an open market wireless device. The open market wireless device characteristically includes a removable module that is provisioned by a network operator with provisioning information for the requested network service.

At Event 502, the network server determines if network service proxying is necessary for the network service launch request. Network service proxying may be required if the certain proxying criteria is met. The proxying criteria may include device profile information, subscriber information, wireless network and/or network service provisioning information, network conditions, network resource availability wireless device state or the like. In addition, network service proxying may be based on a business arrangement between the network service provider that receives the launch request and a third party network service provider.

If a determination is made that network service proxying is necessary then, at Event 504, the launch request is proxied to a predetermined third party network service provider. If a determination is made that network service proxying is not necessary then, at Event 506, the network service is delivered from the network service provider to whom the launch request was initially received.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Thus, presently described methods, systems and apparatus allow a network operator to control the source for network services in open market devices by provisioning the network operator-issued removable modules with network service provisioning information associated with the operator and configuring the open market wireless devices such that the device looks to the removable module first for the network service provisioning information before looking to device storage for any other provisioning information related to the network service. In this regard, the user of the open market wireless device is still provided access to the network service even if the network operator does not provide the service or provide access to the service. Additionally, the described aspects methods, systems and apparatus provide the network operator with an additional level of dynamic control over the source for network services by providing for a network-side proxying features that allows the network operator to proxy network service requests sent from the open market wireless devices to a designated third party network service provider based on criteria defined by the network operator. The defined criteria may include, but is not limited to, device type (e.g. make and/or model), subscriber info/status, provisioning info/status, current network conditions, current network resource availability, current state of the wireless device or the like.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of dynamic source determination of provisioning information on an open market wireless communication device, comprising:
    receiving an input to launch a network service on an open market wireless communication device;
    determining if first provisioning information corresponding to the network service is stored on a removable module attached to the wireless communication device;
    if the first provisioning information is stored on the removable module, then launching the network service on the wireless communications device according to the first provisioning information; and
    if the first provisioning information is not stored on the removable module, then determining if second provisioning information corresponding to the network service is stored in a non-removable memory of the wireless communication device, and if the second provisioning information corresponding to the service is stored in the non-removable memory, then launching the network service on the wireless communications device according to the second provisioning information.

2. The method of claim 1, wherein determining if first provisioning information corresponding to the network service further comprises determining if first provisioning information corresponding to the network service is stored on a removable module attached to the wireless communication device, wherein the first provisioning information is associated with a network operator associated with the removable module.

3. The method of claim 1, wherein determining if second provisioning information corresponding to the network service, further comprises determining if second provisioning information corresponding to the network service is stored in a non-removable memory of the wireless communication device, wherein the second provisioning information is associated with a third party network service provider.

4. The method of claim 3, wherein the third party network service provider is further defined as an Original Equipment Manufacturer (OEM) of the open market wireless communication device.

5. The method of claim 1, further comprising receiving the network service from a network service operator associated with the removable module based on launching the network service according to the first provisioning information.

6. The method of claim 5, wherein receiving the network service from the network service operator further comprises receiving the network service from the network service operator based on a dynamic determination by the network service operator not to proxy delivery of the network service to a third party network service provider.

7. The method of claim 6, wherein receiving the network service from the network service operator further comprises receiving the network service from the network service operator based on a dynamic determination by the network service operator not to proxy delivery of the network service to a third party network service provider, wherein the dynamic determination is based on at least one of subscriber information, or wireless device profile information or provisioning information or current network conditions, or current network resource availability, or current state of the wireless communication device.

8. The method of claim 1, further comprising receiving the network service from a third party network service provider based on launching the network service according to the first provisioning information.

9. The method of claim 8, wherein receiving the network service from the third party network service provider further comprises receiving the network service from the third party network service provider based on a dynamic determination by a network service operator to proxy delivery of the network service to the third party network service provider.

10. The method of claim 9, wherein the dynamic determination is based on at least one of subscriber information, or wireless device profile information or provisioning information or current network conditions, or current network resource availability, or current state of the wireless communication device.

11. The method of claim 1, further comprising receiving the network service from a third party network service provider based on launching the network service according to the second provisioning information.

12. At least one processor configured to provide source determination of provisioning information on an open market wireless communication device, comprising:
 a first module for receiving an input to launch a network service on an open market wireless communication device;
 a second module for determining if first provisioning information corresponding to the network service is stored on a removable module attached to the wireless communication device;
 a third module for launching the network service on the wireless communications device according to the first provisioning information if the first provisioning information is stored on the removable module;
 a fourth module for determining if second provisioning information corresponding to the network service is stored in a non-removable memory of the wireless communication device if the first provisioning information is not stored on the removable module; and
 a fifth module for launching the network service on the wireless communications device according to the second provisioning information if the second provisioning information corresponding to the service is stored in the non-removable memory.

13. A computer program product, comprising:
 a non-transitory computer-readable storage medium comprising:
  a first set of codes for causing a computer to receive an input to launch a network service on an open market wireless communication device;
  a second set of codes for causing a computer to determine if first provisioning information corresponding to the network service is stored on a removable module attached to the wireless communication device;
  a third set of codes for causing the computer to launch the network service on the wireless communications device according to the first provisioning information if the first provisioning information is stored on the removable module;
  a fourth set of codes for causing the computer to determining if second provisioning information corresponding to the network service is stored in a non-removable memory of the wireless communication device if the first provisioning information is not stored on the removable module; and
  a fifth set of codes for causing the computer to launch the network service on the wireless communications device according to the second provisioning information if the second provisioning information corresponding to the service is stored in the non-removable memory.

14. An apparatus for source determination of provisioning information on a wireless communication device, comprising:
 means for receiving an input to launch a network service on an open market wireless communication device;
 means for determining if first provisioning information corresponding to the network service is stored on a removable module attached to the wireless communication device;
 means for launching the network service on the wireless communications device according to the first provisioning information if the first provisioning information is stored on the removable module;
 means for determining if second provisioning information corresponding to the network service is stored in a non-removable memory of the wireless communication device if the first provisioning information is not stored on the removable module; and
 means for launching the network service on the wireless communications device according to the second provisioning information if the second provisioning information corresponding to the service is stored in the non-removable memory.

15. An open market wireless communication device, comprising:
 a computer platform including a processor and memory in communication with the processor;
 a removable module attached to the wireless communication device and in communication with the processor and operable to store data;
 one or more network service clients executable by the processor and stored in the a non-removable memory;
 a user interface in communication with the processor and operable to receive an input to launch one of the network service clients on the open market wireless communication device; and
 provisioning source determination logic executable by the processor and in communication with the removable module and the non-removable memory, wherein responsive to the input the provisioning source determination logic is operable to:
  determine if first provisioning information corresponding to the network service is stored on a removable module attached to the wireless communication device;
  launch the network service on the wireless communications device according to the first provisioning information if the first provisioning information is stored on the removable module;
  determine if second provisioning information corresponding to the network service is stored in a non-removable memory of the wireless communication device if the first provisioning information is not stored on the removable module; and
  launch the network service on the wireless communications device according to the second provisioning information if the second provisioning information corresponding to the service is stored in the non-removable memory.

16. The open market wireless communication device of claim 15, wherein the first provisioning information is associated with a network operator associated with the removable module.

17. The open market wireless communication device of claim 15, wherein the second provisioning information is associated with a third party network service provider.

18. The open market wireless communication device of claim 17, wherein the third party network service provider is further defined as an Original Equipment Manufacturer (OEM) of the open market wireless communication device.

19. The open market wireless communication device of claim 15, further comprising a communications module in communication with the processor and operable to receive the network service from the a network service operator associated with the removable module based on launching the network service according to the first provisioning information.

20. The open market wireless communication device of claim 19, wherein the communications module is further operable to receive the network service from the network service operator based on a dynamic determination by the network service operator not to proxy the delivery of the network service to a third party network service operator.

21. The open market wireless communication device of claim 15, further comprising a communications module in communication with the processor and further operable to receive the network service from a third party network service party based on launching the network service according to the first provisioning information.

22. The open market wireless communication device of claim 21, wherein the communications module is further operable to receive the network service from the third party network service party based on a dynamic determination by the network service operator to proxy the delivery of the network service to a third party network service operator.

23. The open market wireless communication device of claim 19, wherein the communications module is further operable to receive the network service from a third party network service party based on launching the network service according to the second provisioning information.

24. A method for determining and implementing service proxy requirements on a per network service request basis, comprising:
  receiving, at a network service provider server, a network service launch request from an open market wireless device that includes a removable module that is provisioned by a network operator with provisioning information for the requested network service;
  determining if service proxying is necessary for the network service launch request, wherein the network service provider server is configured to use service proxying to control which one of the network service provider server and a predetermined third party network service provider is to provide the network service to the open market wireless device; and
  if service proxying is necessary for the network service request, proxying the network service launch request to the predetermined third party network service provider; and
  if service proxying is not necessary for the network service request, delivering the requested network service from the network service provider.

25. The method of claim 24, wherein the network service provider server that receives the network service launch request is further defined as a server associated with the network operator.

26. The method of claim 24, wherein determining if service proxying is necessary further comprises determining if service proxying is necessary for the network service access request according to a dynamic determination based on at least one of subscriber information, or the open market wireless communication device profile information, or provisioning information for the network service, or current network conditions, or current network resource availability, or current state of the open market wireless device.

27. The method of claim 24, wherein determining if service proxying is necessary further comprises determining if service proxying is necessary for the network service launch request based on a business arrangement with one or more third party network service providers.

28. The method of claim 24, wherein receiving a network service launch request from an open market wireless device further comprises receiving a network service launch request from an open market wireless device in response to a determination by the wireless device that the removable module includes provisioning information for the network service provider.

29. At least one processor configured to provide determination of service proxy requirements on a per network service request basis, comprising:
  a first module for receiving a network service launch request from an open market wireless device that includes a removable module that is provisioned by a network operator with network service provisioning information;
  a second module for determining if service proxying is necessary for the network service launch request, wherein a network service provider server is configured to use service proxying to control which one of the network service provider server and a predetermined third party network service provider is to provide the network service to the open market wireless device;
  a third module for proxying the network service launch request to the predetermined third party network service provider if the determination is made that service proxying is necessary; and
  a fourth module for delivering the requested network service from the network service provider if the determination is made that service proxying is not necessary.

30. A computer program product, comprising:
  a non-transitory computer-readable storage comprising:
    a first set of codes for causing a computer to receive a network service launch request from an open market wireless device that includes a removable module that is provisioned by a network operator with network service provisioning information;
    a second set of codes for causing the computer to determine if service proxying is necessary for the network service launch request, wherein a network service provider server is configured to use service proxying to control which one of the network service provider server and a predetermined third party network service provider is to provide the network service to the open market wireless device;
    a third set of codes for causing the computer to proxy the network service launch request to the predetermined third party network service provider if the determination is made that service proxying is necessary; and
    a fourth set of codes for causing the computer to deliver the requested network service from the network service provider if the determination is made that service proxying is not necessary.

31. An apparatus for dynamic source determination of provisioning information on a wireless communication device, comprising:
- means for receiving a network service launch request from an open market wireless device that includes a removable module that is provisioned by a network operator with network service provisioning information;
- means for determining if service proxying is necessary for the network service launch request, wherein a network service provider server is configured to use service proxying to control which one of the network service provider server and a predetermined third party network service provider is to provide the network service to the open market wireless device;
- means for proxying the network service launch request to the predetermined third party network service provider if the determination is made that service proxying is necessary; and
- means for delivering the requested network service from the network service provider if the determination is made that service proxying is not necessary.

32. A network server, comprising:
- a computer platform including a processor and a memory in communication with the processor and operable to store data;
- a communications module in communication with the processor and operable to receive a network service launch request from an open market wireless device that includes a removable module that is provisioned by a network operator with network service provisioning information; and
- network service proxying logic executable by the processor and operable to determine if service proxying is necessary for the network service launch request, wherein a network service provider server is configured to use service proxying to control which one of the network service provider server and a predetermined third party network service provider is to provide the network service to the open market wireless device, and wherein the determination of whether service proxying is necessary is based on a predetermined proxying routine and, if service proxying is necessary, proxying the network service launch request to a predetermined third party network service provider.

33. The network server of claim 32, wherein the network server is further defined as a server associated with the network service operator.

34. The network server of claim 32, wherein the predetermined proxying routine is further operable to dynamically determine if service proxying is necessary based on at least one of subscriber information, or the open market wireless communication device profile information, or provisioning information for the network service, or current network conditions, or current available network resources, or a state of the open market wireless device.

35. The network server of claim 32, wherein the predetermined proxying routine is further defined as being implemented based on a business arrangement with one or more third party network service providers.

36. The network server of claim 32, wherein the communications module is further operable to receive the network service launch request from the open market wireless device in response to a determination by the wireless device that the removable module includes provisioning information for the network service.

37. The network server of claim 32, wherein the communications module is operable to deliver the network service to the open market wireless device if the predetermined proxying routine determines that proxying is not necessary.

38. A method of dynamic source determination of provisioning information on an open market wireless communication device, comprising:
- receiving an input to launch a network service on an open market wireless communication device;
- determining if first provisioning information corresponding to the network service is stored on a removable module in communication with the wireless communication device;
- if the first provisioning information is stored on the removable module, then launching the network service on the wireless communications device according to the first provisioning information;
- if the first provisioning information is not stored on the removable module, then determining if second provisioning information corresponding to the network service is stored in a non-removable memory of the wireless communication device, and if the second provisioning information corresponding to the service is stored in the non-removable memory, then launching the network service on the wireless communications device according to the second provisioning information; and
- wherein determining if second provisioning information corresponding to the network service, further comprises determining if second provisioning information corresponding to the network service is stored in a non-removable memory of the wireless communication device, wherein the second provisioning information is associated with a third party network service provider, and wherein the third party network service provider is further defined as an Original Equipment Manufacturer (OEM) of the open market wireless communication device.

* * * * *